(12) United States Patent
Cowley et al.

(10) Patent No.: US 8,335,279 B2
(45) Date of Patent: Dec. 18, 2012

(54) ALIGNMENT OF CHANNEL FILTERS FOR MULTIPLE-TUNER APPARATUSES

(75) Inventors: Nicholas P. Cowley, Wroughton (GB); Keith Pinson, Swindon (GB); Isaac Ali, Bristol (GB)

(73) Assignee: Intel Corporation, Santa Clara, CA (US)

( * ) Notice: Subject to any disclaimer, the term of this patent is extended or adjusted under 35 U.S.C. 154(b) by 643 days.

(21) Appl. No.: 12/460,811

(22) Filed: Jul. 24, 2009

(65) Prior Publication Data

US 2011/0019785 A1    Jan. 27, 2011

(51) Int. Cl.
*H04L 27/00* (2006.01)
*H04K 9/00* (2006.01)
(52) U.S. Cl. ......... 375/316; 375/324; 375/340; 375/350
(58) Field of Classification Search .................. 375/316, 375/324, 340, 350
See application file for complete search history.

(56) References Cited

U.S. PATENT DOCUMENTS

| | | | |
|---|---|---|---|
| 4,334,323 A | 6/1982 | Moore | |
| 4,402,089 A | 8/1983 | Knight et al. | |
| 4,685,150 A | 8/1987 | Maier | |
| 4,799,029 A | 1/1989 | Minomo | |
| 5,101,509 A | 3/1992 | Lai | |
| 5,280,638 A | 1/1994 | Porambo et al. | |
| 5,479,449 A | 12/1995 | Patel et al. | |
| 5,654,774 A | 8/1997 | Pugel et al. | |
| 5,898,900 A | 4/1999 | Richter et al. | |
| 6,400,393 B1 | 6/2002 | Limberg | |
| 7,068,171 B2 | 6/2006 | Gardenfors et al. | |
| 7,317,493 B1 | 1/2008 | Hutchinson et al. | |
| 7,414,676 B2 | 8/2008 | Lindstrom et al. | |
| 7,512,391 B2 | 3/2009 | Lester et al. | |
| 2005/0026579 A1* | 2/2005 | Yoneu | 455/147 |
| 2007/0063757 A1* | 3/2007 | Bouras | 327/307 |
| 2009/0088121 A1 | 4/2009 | Xing et al. | |
| 2009/0109347 A1 | 4/2009 | Lester et al. | |

* cited by examiner

*Primary Examiner* — Ted Wang
(74) *Attorney, Agent, or Firm* — Schubert Law Group PLLC (57) ABSTRACT

Apparatuses, systems, and methods that align channel filters for dual tuners are disclosed. An embodiment may comprise an IC having two tuners. Each tuner may have a low-noise amplifier, a mixer with a local oscillator, and channel filter. To perform a channel filter alignment, a bandwidth controller may cross-couple the local oscillator of each tuner to the input of the mixer of the opposite tuner. The bandwidth controller may adjust the frequencies of the local oscillators to produce different configuration tone frequencies at the outputs of the mixers, which are inputs to the channel filters. The bandwidth controller may then determine an amplitude difference between two separate measurements of a channel filter output and, based on a comparison of the measurements with predicted values, increment or decrement the filter bandwidth for each tuner and store parameters for the channel filters which create the largest signal amplitudes.

19 Claims, 4 Drawing Sheets

ALIGNMENT OF CHANNEL FILTERS FOR MULTIPLE-TUNER APPARATUSES

FIELD

The embodiments herein are in the field of radio communications. More particularly, the embodiments relate to aligning channel filters for apparatuses and systems having multiple tuners.

BACKGROUND

In a typical radio frequency (RF) communications system, data may be processed at a transmitter device, modulated, filtered, amplified, and transmitted to one or more receiver devices. The transmitted signal typically experiences path loss, multipath interference, and other types of signal degradation before reaching the receiver devices. A receiver device receives the modulated signal, performs various types of conditioning, and demodulates the conditioned signal to recover the transmitted data. The signal conditioning typically includes low noise amplification, filtering, automatic gain control, frequency conversion, sampling, quantization, and so on. A tuner is a common circuit that performs many of these functions. One component of a tuner, such as a tuner for a satellite receiver, is a channel filter. For proper performance, channel filters usually need to be aligned.

Methods for aligning channel filters are known. An example of this is the master-slave solution. In this approach, one of the filter elements is duplicated and configured as an oscillator, which is then frequency-locked by a frequency-locked-loop (FLL) or similar. This first element is referred to as the master element. The control signal generated to tune the master is also used tune the filter (slave) in conjunction with the master. The master oscillator frequency and slave bandwidth are related by a correlation factor, which enables achieving a desired bandwidth by selecting an appropriate programming frequency. The master-slave method works satisfactorily but encumbers the radio with additional circuitry and power, such as the circuitry and power related to the additional filter element, the FLL, and loop filter components. The master-slave method may also introduce spurious amounts of noise due to the FLL in the output spectrum when the FLL is operating. Consequently, careful design and layout must be applied to minimize this effect.

BRIEF DESCRIPTION OF THE DRAWINGS

Aspects of the embodiments will become apparent upon reading the following detailed description and upon reference to the accompanying drawings in which like references may indicate similar elements.

DETAILED DESCRIPTION OF EMBODIMENTS

The following is a detailed description of embodiments depicted in the accompanying drawings. The specification is in such detail as to clearly communicate the embodiments. However, the amount of detail offered is not intended to limit the anticipated variations of embodiments. To the contrary, the intention is to cover all modifications, equivalents, and alternatives consistent with the spirit and scope of the embodiments as defined by the appended claims.

Generally speaking, methods, apparatuses, and systems that align channel filters for dual tuners are contemplated. An embodiment may comprise an integrated circuit having at least two tuners. Each tuner may have a low-noise amplifier (LNA), a mixer with a local oscillator, and a channel filter. To perform a channel filter alignment for each tuner, a bandwidth controller may cross-couple the local oscillator of each tuner to the input of the mixer of the opposite tuner, enabling each tuner to have two separate frequencies for its respective mixer. The bandwidth controller may adjust the frequencies of the local oscillators to produce different configuration tone frequencies at the outputs of the mixers, which are inputs to the channel filters. The bandwidth controller may then determine an amplitude difference between two separate measurements of a channel filter output, and compare the measured amplitude to the desired amplitude of a known or predetermined filter characteristic and frequency. Based on the comparison, the bandwidth controller may increment or decrement the filter bandwidth for each tuner and store parameters for the channel filters which create a measured value closest to the desired.

Method embodiments generally comprise coupling, in an integrated circuit comprising multiple tuners, a local oscillator (LO) of a first tuner to a mixer input of a second tuner and coupling a LO of the second tuner to a mixer input of the first tuner. The method embodiments may further comprise generating, via the LOs, a calibration tone at the output of the mixer of the first tuner that lies within the passband of a channel filter of the first tuner. The methods may also involve generating, via the local oscillators, a calibration tone at the output of the mixer of the first tuner that lies within the transition region of the channel filter of the first tuner. Further, the embodiments comprise measuring amplitudes of the outputs of the channel filter for the plurality of calibration tones and adjusting the bandwidth of the channel filter based upon the measuring of the amplitudes of the channel filter output.

An apparatus embodiment may comprise a first tuner having a first local oscillator (LO) coupled to a first mixer, with the output of the first mixer coupled to the input of a first channel filter. The apparatus further comprises a second tuner, with the second tuner having a second LO coupled to a second mixer, with the output of the second mixer coupled to the input of a second channel filter. The first and second tuners are in an integrated circuit comprising multiple tuners. Further, the apparatus embodiment has a bandwidth controller coupled to both tuners. The bandwidth controller is configured to alter frequencies of at least one of the LOs to generate a plurality of calibration tones and associated plurality of filtered signals at the output of the first channel filter. Based on a comparison of signal amplitudes of the plurality of filtered signals, the bandwidth controller is configured to adjust a bandwidth parameter of the first channel filter.

A system embodiment may comprise a first channel filter of a first tuner, the input of the first channel filter coupled to the output of a first mixer, with the first mixer coupled to a first LO. The system further comprises a second channel filter of a second tuner, the input of the second channel filter selectively coupled to the output of a second mixer, with the second mixer coupled to a second LO. Both tuners comprise circuits of an integrated circuit having multiple tuners. The system also has a bandwidth controller (BC) coupled to the first and second tuners. The BC is configured to couple the first LO to the second mixer and couple the second LO to the first mixer. The BC is also configured to generate differing calibration tones at the outputs of the first and second mixers based on differing frequencies of the first and second LOs. Based on amplitudes of filter output signals corresponding to the different calibration tones, the BC is further configured to determine and store parameters of the first and second channels.

The embodiments may be described herein in terms of functional and/or logical block components and various processing activities. It should be appreciated that such block components may be realized by any number of hardware, software, and/or firmware components configured to perform the specified functions. For example, an embodiment may employ various integrated circuit components, e.g., memory elements, logic elements, look-up tables, or the like, which may carry out a variety of functions under the control of one or more microprocessors or other control devices. Instructions of the microprocessors may be stored in volatile memory, such as dynamic random access memory (DRAM), or in nonvolatile memory, such as firmware. In addition, those skilled in the art will appreciate that the present invention may be practiced in conjunction with any number of wideband radio receiver applications and that the television tuner circuit described herein is merely one exemplary application for the invention.

For the sake of brevity, conventional techniques related to television signal reception and processing, resonator filter design, phase detection, RF switching, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common mode).

The following description refers to nodes or features being "connected" or "coupled" together. As used herein, unless expressly stated otherwise, "coupled" means that one node/feature is directly or indirectly coupled to another node/feature, and not necessarily physically. As used herein, unless expressly stated otherwise, "connected" means that one node/feature is directly connected to another node/feature. In particular, a switch may be "coupled" to a plurality of nodes, but all of those nodes need not always be "connected" to each other; the switch may connect different nodes to each other depending upon the state of the switch. Furthermore, although the various schematics shown herein depict certain example arrangements of elements, additional intervening elements, devices, features, or components may be present in an actual embodiment (assuming that the functionality of the given circuit is not adversely affected).

Figure 1:
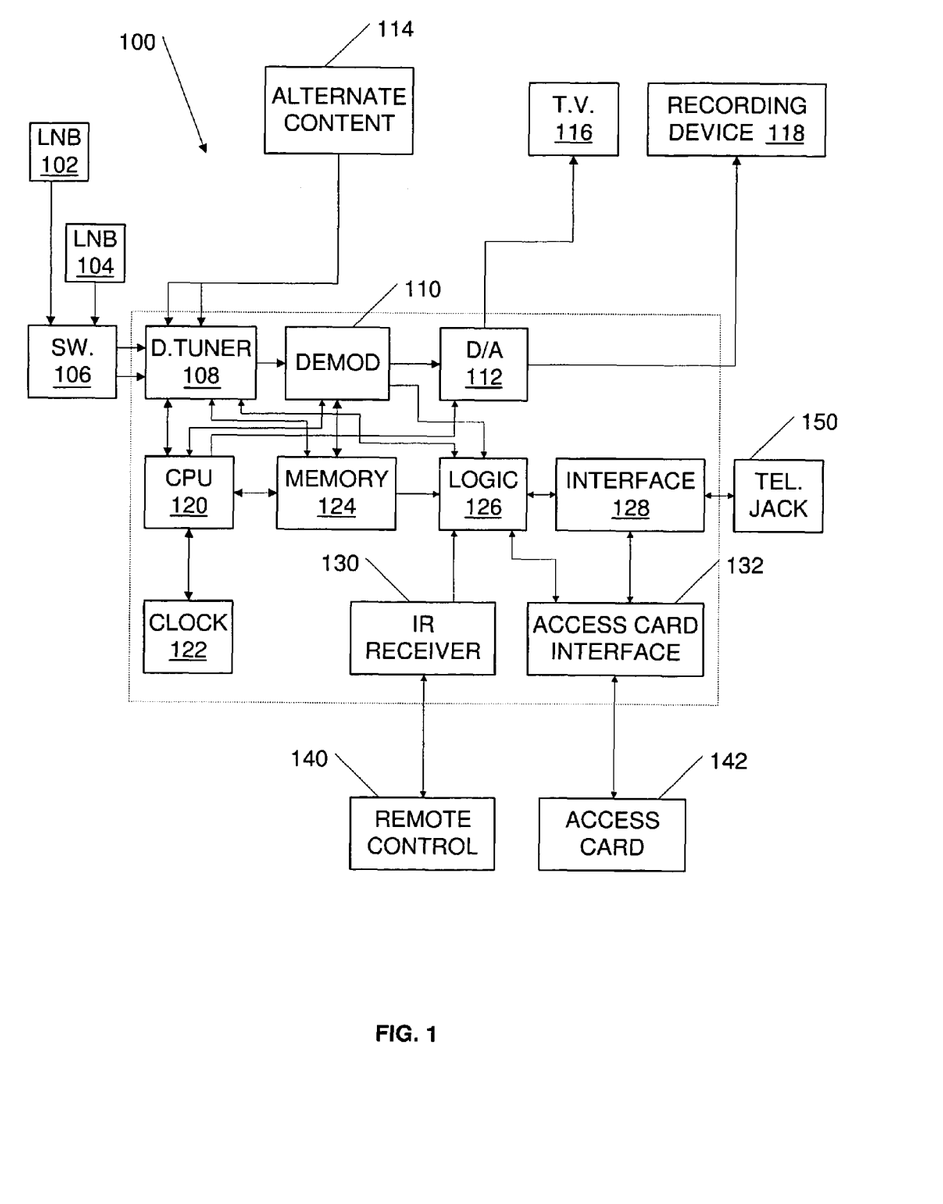
FIG. 1 shows the system components of a receiver that may align channel filters of a dual tuner.

Turning now to the drawings, FIG. 1 illustrates an embodiment of a communications receiving device, receiver 100, which may align channel filters of a dual tuner 108. For example, receiver 100 may comprise a satellite receiver system, having two tuners on a single integrated circuit chip, used to receive and descramble programming content from a satellite programming provider, such as DirecTV®, Dish Network®, or National Programming Service, Inc. During operation, which may involve selecting channel frequencies from a satellite or an antenna, receiver 100 may automatically align channel filters of dual tuner 108.

Receiver 100 may receive and decode audio, video, and data signals, such as digital video broadcasting (DVB) signals. For example, receiver 100 may comprise a set-top box, also known as an Integrated Receiver Decoder (IRD), in a home or multi-dwelling unit. Receiver 100 may also be a Personal Video Recorder (PVR) which may record signals via recording device 118 for playback at a later date.

Receiver 100 may employ a switch 106 to select between a first low noise block down-converter (LNB) 102 and a second LNB 104. LNB 102 may receive signals from one satellite, while LNB 104 receives signals from a second satellite. Receiver 100 may also be coupled to an alternate content source 114, television 116, remote control 140, and access card 142. In addition to receiving digital satellite signals, receiver 100 may also perform phase error correction via conditional probabilities for other sources of television content. As a specific example, alternate content source 114 may provide additional television content for television 116, such as a broadcast terrestrial UHF signal digitally encoded per the Advanced Television Systems Committee (ATSC) standards. As depicted in FIG. 1, alternate content source 114 may be transferred to dual tuner 108. Although only one alternate content source 114 is shown, multiple sources may be used in alternative embodiments. For example, an alternative embodiment may comprise two antennas, one antenna coupled to each input of dual tuner 108.

Receiver 100 may include dual tuner 108 and demodulator 110, digital-to-analog (D/A) converter 112, central processing unit (CPU) 120, clock 122, memory 124, logic circuit 126, interface 128, infrared (IR) receiver 130, and access card interface 132. Receiver 100 may receive signals sent by satellites, amplify the signals, and pass the signals to dual tuner 108. In other words, receiver 100 may include filters and amplifier circuits between switch 106 and dual tuner 108.

Dual tuner 108 and demodulator 110 may operate under control of CPU 120. Specifically, for the embodiment of receiver 100 depicted in FIG. 1, CPU 120 may control the operation of channel filter alignment in dual tuner 108. However, in many alternative embodiments, the channel filter alignment may be carried out or processed independently of any central processing unit, such as entirely within dual tuner 108 or by a dedicated circuit incorporated onto the same substrate as dual tuner 108 and therefore being in the same integrated package as dual tuner 108.

In the embodiment of FIG. 1, CPU 120 operates under the control of an operating system stored in the memory 124. The functions performed by CPU 120 may be controlled by one or more control programs or applications stored in memory 124. The operating system and applications comprise instructions which, when read and executed by the CPU 120, cause receiver 100 to perform the functions and steps necessary to align channel filters of dual tuner 108 via local oscillators. Instructions implementing such applications are tangibly embodied in a computer-readable medium, such as memory 124.

CPU 120 may also communicate with other devices through interface 128, LNB 102, or LNB 104 to accept commands or instructions to be stored in the memory 124. For example, upgraded instructions may be downloaded to receiver 100 which alter or change the manner in which receiver performs channel filter alignments, such as by changing a specific calculation method to speed calculation of filter bandwidth parameters.

Clock 122 may provide the current local time to CPU 120. Interface 128 may be coupled to a telephone jack 150 at the site of receiver 100. For example, interface 128 may allow receiver 100 to communicate with a satellite transmission station which via telephone jack 150. Interface 128 may also be used to transfer data to and from a network, such as the Internet. In at least one embodiment, a manufacturer of receiver 100 may upgrade a bandwidth controller for dual tuner 108 with programming data transferred via interface 128. For example, in an alternative embodiment, telephone jack 150 may comprise an Ethernet jack coupled to the Internet.

The signals sent to receiver 100 and dual tuner 108 may comprise a plurality of modulated RF signals. Receiver 100 may then convert specific RF signals to baseband signals via dual tuner 108, which may generate in-phase and quadrature-phase ("I" and "Q") components for the RF signals. For example, a transmitted data symbol may be represented by both "I" and "Q" quadrature components which represent quadrature phased carriers at a given frequency. Each symbol may comprise several bits, and the number of bits/symbol may dictate the type of modulation, e.g., 16-QAM, 32-QPSK, etc.

When a user selects a channel using remote control 140, IR receiver 130 may relay the selection to logic circuit 126, which passes the selection to memory 124 where the selection may be accessed by CPU 120. CPU 120 may perform MPEG2/MPEG4 decoding for the audio/video and generate the audio and video signals for the selected channel to D/A converter 112. D/A converter 112 may convert the digital signals to analog signals and pass the analog signals to television 116. In some alternative embodiments, television 116 may comprise a digital television, in which case no digital to analog conversion in receiver 100 may be necessary. In other words, an alternate form of receiver 100 may include no D/A converter 112.

The embodiment of FIG. 1 was described as a satellite receiver system. However, those having ordinary skill in the art will appreciate that the form of receiver 100 may vary in alternative embodiments. For example, one alternative embodiment of receiver 100 may comprise a cable television receiver that aligns channel filters of dual tuners.

Figure 2:
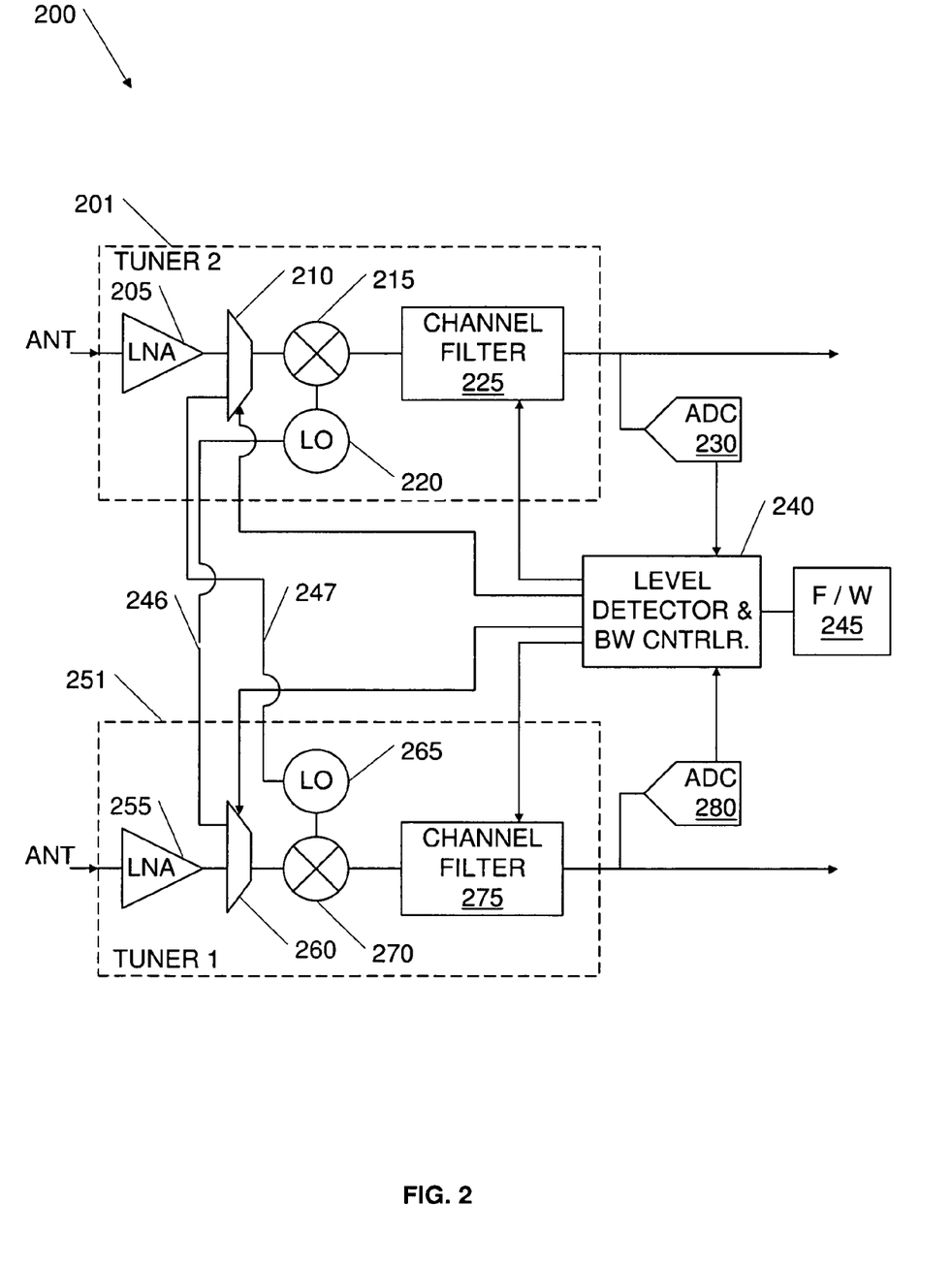
FIG. 2 illustrates in greater detail how a receiver or other apparatus may align channel filters for dual tuners.

To illustrate in greater detail how a receiver, such as receiver 100, or other apparatus may align channel filters for dual tuners, we turn now to FIG. 2. FIG. 2 depicts an apparatus 200 having two tuners, first tuner 251 and second tuner 201. Apparatus 200 may comprise elements of a single integrated circuit chip. For example, tuners 251 and 201 may comprise tuners of dual tuner 108 depicted in FIG. 1, wherein both tuners 251 and 201 are in the same IC housing.

Each tuner of apparatus 200 has three stages. The first stage of tuner 251 comprises a low-noise amplifier (LNA) 255. LNA 255 receives a signal from an input, such as from an antenna or, alternatively, a satellite dish LNB or cable television coaxial cable, amplifies the signal and transmits the amplified signal to RF multiplexer (MUX) 260. Mixer 270 combines the output of RF MUX 260 with the output of local oscillator (LO) 265. Channel filter 275 receives the output of mixer 270 and produces a filtered output signal which is transferred to analog-to-digital-converter (ADC) 280. ADC 280 may transmit a digital signal to various other types of digital processing circuits such as buffers, MPEG-2 and/or MPEG-4 processing circuits, and digital audio decoding circuits. The output of channel filter 275 may also be sent to other types of analog-processing circuits, such as demodulator circuits, surface acoustic wave filters, and IF amplifier circuits, as just a few examples.

Tuner 201 may be arranged in a similar manner to tuner 251. The first stage of tuner 201 comprises LNA 205. Also similar to tuner 251, LNA 205 of tuner 201 may receive an input signal from an antenna, a satellite dish, or cable television coaxial cable. LNA 205 may amplify the signal and transmit the amplified signal to RF MUX 210. Mixer 215 may combine the output of RF MUX 210 with the output of LO 220. Channel filter 225 receives the output of mixer 215 and produces a filtered output signal which is transferred to ADC 230. Similar to tuner 251, ADC 230 may transmit a digital signal to various other types of digital processing circuits that decode and process video, audio, and auxiliary contained within the output signal from channel filter 225. Also similar to tuner 251, the output of channel filter 225 may also be sent to other types of analog-processing circuits.

Apparatus 200 also comprises a bandwidth controller 240. Bandwidth controller 240 may be coupled with firmware 245 and/or other memory, depending on the embodiment. Depending on the various types of memory that may be employed in different embodiments, the memory may be used for different functions. In some embodiments, the memory may only store data. In other embodiments, the memory may store only operating instructions for a processor of bandwidth controller 240. In the embodiment depicted in FIG. 2, firmware 245 stores both data values for tuning channel filters 275 and 225 and coded instructions which control the operation of bandwidth controller 240. For example, bandwidth controller 240 and firmware 245 may comprise CPU 120 and memory 124, respectively, depicted in FIG. 1. Bandwidth controller 240 may retrieve instructions from firmware 245 and perform operations defined by the instructions. When performing the operations during an alignment process, bandwidth controller 240 may also retrieve and store alignment data in firmware 245.

Bandwidth controller 240 may be able to control elements of tuners 251 and 201 during at least two different modes. A first mode may be referred to as a viewing or normal mode. The second mode to be referred to as a calibration or alignment mode. During normal operation of tuner 251 and tuner 201, bandwidth controller 240 may send signals to RF MUXs 260 and 210 which cause the amplified signals from LNA 255 and LNA 205 to be sent to mixers 270 and 215, respectively. For example, bandwidth controller 240 may send a logical low signal to the input selector of RF MUX 260 which couples the output of LNA 255 to one of the inputs of mixer 270. Similarly, bandwidth controller 240 may send a logical low signal to the input selector of RF MUX 210 which couples the output of LNA 205 to one of the inputs of mixer 215.

During the normal mode, mixer 270 may combine the signal produced by LNA 255 with a fixed frequency from LO 265. Channel filter 275 may filter the combined signal by attenuating all frequencies falling outside a selected channel, or band. For example, a user of a television receiver which incorporates apparatus 200 may select a specific channel for viewing on tuner 251. Based on the selected channel of the user, bandwidth controller 240 or some other channel selection circuitry may send a set of voltage control signals to channel filter 275 that enables channel filter 275 to pass frequencies falling within the band and attenuate frequencies falling outside the band. Whenever the user changes the channel of the television, bandwidth controller 240 may send another set of voltage control signals to channel filter 275, enabling channel filter 275 to pass frequencies falling within the band of the changed channel and attenuate other frequencies. Bandwidth controller 240, or the other channel selection circuitry depending on the embodiment, may control channel filter 225 of tuner 201 in a similar manner during normal operation.

During alignment of channel filter 275 and/or channel filter 225 in the alignment mode, bandwidth controller 240 may switch or otherwise control numerous components of tuners 251 and 201. Bandwidth controller 240 may send a high-level signal to the selection input of RF MUX 260, causing RF MUX 260 to couple the output of LO 220 from tuner 201 to mixer 270 (element 246). During this alignment mode, then, one can see that mixer 270 will combine the signals of LO 265 and LO 220 to generate a first calibration tone which is then sent to channel filter 275. In other words, during an alignment operation, the calibration tone from mixer 270 may comprise the combined signals of LO 220 and LO 265. Bandwidth controller 240 may also send a high-level signal to the selection input of RF MUX 210, causing RF MUX 210 to couple the output of LO 265 from tuner 251 to mixer 215 (element 247). Consequently, mixer 215 will combine the signals of LO 220 and LO 265 to produce a second calibration tone for channel filter 225.

By using the local oscillator of each of the other respective tuners, apparatus 200 is able to generate the alignment tones directly, without the need for additional oscillators for calibration or channel alignment. Apparatus 200 may control the frequencies of LO 265 and LO 220, setting the commutating frequencies to have a frequency offset that lies within the filter passband of each respective channel filter. For example, apparatus 200 may need to generate a calibration tone of "$F_{op}$" at the output of mixer 270 to align channel filter 275 for the channel centered around $F_{op}$. For tuner 251, to generate a calibration tone with a frequency equal to $F_{op}$, mixer 270 may need an input frequency ($F_{ip}$) of $F_{lo}+F_{op}$ (or $F_{lo}-F_{op}$) to combine with the frequency of LO 265. To derive a signal having a frequency equal to $F_{lo}+F_{op}$ (or $F_{lo}-F_{op}$), bandwidth controller 240 may manipulate or control LO 220, causing LO 220 to oscillate at a frequency equal to $F_{lo}+F_{op}$ (or $F_{lo}-F_{op}$).

By switching the source of RF MUX 210 from LNA 205 to LO 265 (element 247), bandwidth controller 240 may couple a signal with frequency $F_{lo}$ from LO 265 to mixer 215. As described previously for generating the calibration tone of tuner 251, bandwidth controller 240 causes LO 220 to oscillate at a frequency equal to $F_{lo}+F_{op}$ (or $F_{lo}-F_{op}$). By inspection, one may note that the output of mixer 215 is naturally $F_{op}$, i.e. the same frequency as the output of mixer 270 of tuner 251, which may also be the desired frequency for alignment of channel filter 225. In other words, setting one local oscillator at a first frequency and setting the other local oscillator to an offset frequency based on the first frequency, and cross-coupling the signals from each of the tuners to the mixer of the other respective tuner, will generate calibration tones at the outputs of both mixers that contain the offset frequency component ($F_{op}$).

During the alignment process, bandwidth controller 240 may monitor the outputs of ADC 280 and ADC 230. Bandwidth controller 240 may perform a level detection function, measuring the amplitudes of the signals produced by ADCs 280 and 230. In performing the operation of level detection, bandwidth controller 240 may also perform various other types of analyses that gauge the strengths of the digital signals produced by ADCs 280 and 230. For example, in various embodiments, bandwidth controller 240 may calculate the average power for each of ADCs 280 and 230 for a number of cycles. Based on the average power calculated for each of the outputs of the analog-to-digital-converters, bandwidth controller 240 may make bandwidth adjustments to channel filters 275 and 225 to increase the signal levels and/or average power values.

Bandwidth controller 240 may measure and store the output amplitude of the filtered signals from channel filter 275 and channel filter 225, via ADC 280 and ADC 230, respectively. In other words, bandwidth controller may sample the values produced by ADCs 280 and 230 and store the values in, e.g., local RAM memory. Bandwidth controller 240 may measure the amplitudes of the filtered signals by various means in different embodiments. For example, in the embodiment depicted in FIG. 2, bandwidth controller 240 measures the amplitudes of the filtered signals via ADC 280 and 230, which may comprise converters in the front ends of demodulators associated with tuners 251 and 201. In doing so, apparatus 200 may reuse the ADC and level detection functions that reside within the demodulation stages.

After controlling the operation of LO 265 and LO 220 to generate calibration tones having frequency $F_{op}$, bandwidth controller 240 may then alter the frequencies of LO 265 and LO 220, setting the commutating frequencies to have a second frequency offset that lies within the filter transition region of each channel filter. For example, bandwidth controller 240 may need to generate a calibration tone of "$F_{tr}$" at the output of mixer 270. For tuner 251, to generate a calibration tone with a frequency equal to $F_{tr}$, mixer 270 may need an input frequency ($F_{ip}$) of $F_{lo}+F_{tr}$ (or $F_{lo}-F_{tr}$) to combine with the frequency of LO 265. To derive a signal having a frequency equal to $F_{lo}+F_{tr}$ (or $F_{lo}-F_{tr}$), bandwidth controller 240 may manipulate or control LO 220, causing LO 220 to oscillate at a frequency equal to $F_{lo}+F_{tr}$ (or $F_{lo}-F_{tr}$).

Bandwidth controller 240 may then measure and store the output amplitude of the filtered signals from the calibration tones of the transition-related frequency ($F_{tr}$) from channel filter 275 and channel filter 225, via ADC 280 and ADC 230, respectively. Bandwidth controller 240 may determine the amplitude differences between the first set of measured amplitudes and a second set of measured amplitudes. For example, for channel filter 275 bandwidth controller 240 may subtract the amplitude of the second-sampled value for the calibration tone of $F_{tr}$ from the amplitude of the first-sampled value for the calibration tone of $F_{op}$.

Bandwidth controller 240 may then compare the results of the measured amplitudes, as well as the amplitude differences, with desired or predicted values of amplitude for known filter characteristics and frequencies. Based on the comparison, bandwidth controller 240 may increment or decrement the filter bandwidth for each tuner in dependence of whether the measured amplitude difference is greater or lesser than the predicted values. Bandwidth controller 240 may store the alignment settings for channel filter 275 and 225 in nonvolatile memory. For example, bandwidth controller 240 may store the values for the alignment settings in firmware 245. During operation of tuner 251 and/or tuner 201, bandwidth controller 240 may retrieve the channel filter alignment settings from firmware 245 based on the channels selected by one or more users of apparatus 200 or the device incorporating apparatus 200 such as a television or satellite receiver.

The form of channel filter 275 and channel filter 225 may vary from embodiment to embodiment. Although shown in a simplified block-diagram form, channel filter 275 and channel filter 225 may actually comprise pluralities of tunable intermediate frequency (IF) filters and IF amplifiers. Bandwidth controller 240 may control the operations of the IF filters and IF amplifiers via a plurality of digital signals. For example, bandwidth controller 240 may send digital signals and/or digital values to channel filter 275 and channel filter 225 to affect or control the operation of elements of transconductor-capacitor (GmC) filters coupled with amplification circuits. An embodiment with channel filter 275 and channel filter 225 comprising GmC filters and amplification circuits illustrates just one of the potential circuit arrangements which may form channel filters 275 and 225. As one skilled in the art will appreciate, the exact arrangement or configuration of channel filters 275 and 225 will vary in different embodiments, employing different components to perform the channel filtering functions.

I would suggest the above is rewritten to describe gmC filters as would be deployed in this invention Further, FIG. 2 depicts one embodiment of an apparatus 200 that may align channel filters in a dual tuner. One or more elements of apparatus 200 may be in the form of hardware, software, or a combination of both hardware and software. For example, in the embodiment depicted in FIG. 2, some of the elements of bandwidth controller 240 may exist as instruction-coded modules stored in a memory device. For example, the modules may comprise firmware instructions of a program to align channel filters 275 and 225, executed by a processor of bandwidth controller 240.

Figure 3A:
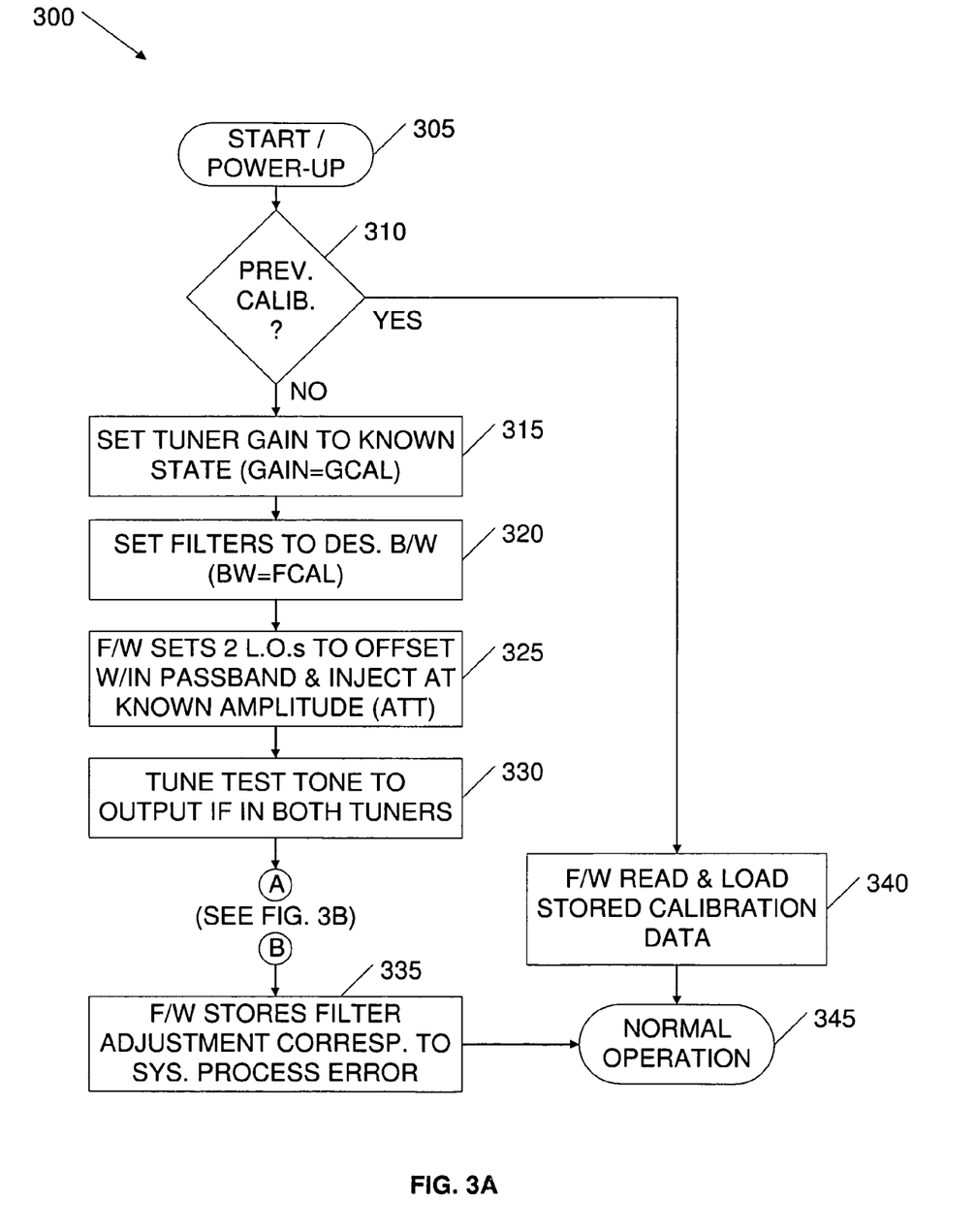
FIGS. 3A-B illustrate a process that one embodiment may go through when aligning the channel filters of dual tuners.
Figure 3B:
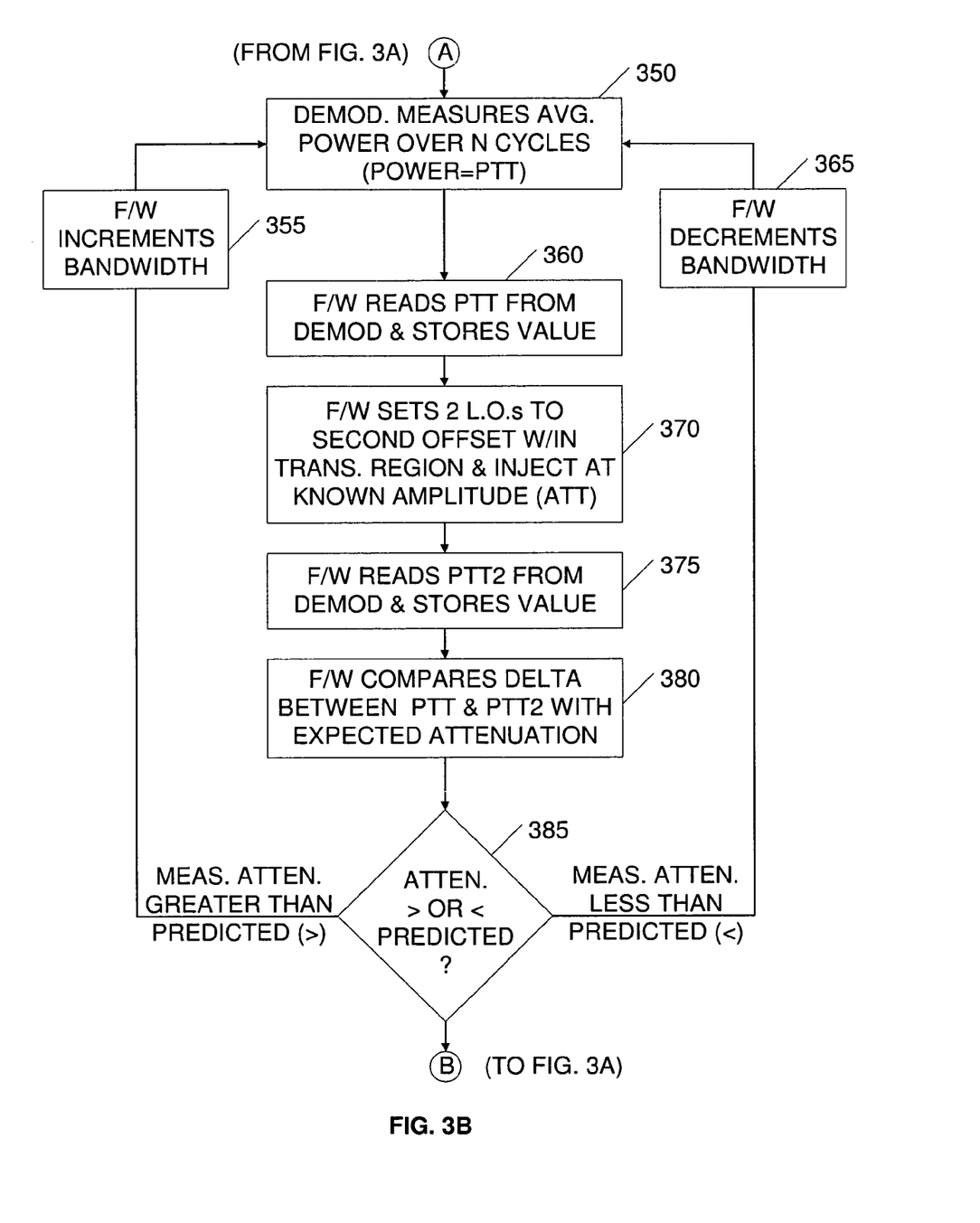

FIG. 3A and FIG. 3B illustrate a process 300 that one embodiment may go through when aligning the channel filters of dual tuners. For example, a digital television may have a dual tuner integrated circuit which performs the process illustrated by FIG. 3A and FIG. 3B whenever power is applied, such as during an initialization sequence each time the television is turned on. One should note however that different embodiments may perform an alignment process at different times. For example, one embodiment may perform the alignment late at night, when the viewing function of the television is turned off. Even further embodiments may perform the alignment more frequently, such as during a change of channels of one tuner when the other tuner is not being used. An embodiment may implement the process illustrated in FIGS. 3A and 3B as a computer program product stored in a tangible medium.

Process 300 may begin when power is applied to the television or other device employing the dual tuners (element 305). Upon power-up, the dual tuner device may determine whether the channel filters have been previously calibrated (element 310). If the channel filters have been previously calibrated, the dual tuner device may read and load stored calibration data from firmware (element 340) and start normal operation (element 345). For example with reference to apparatus 200 in FIG. 2, bandwidth controller 240 may load digital values from firmware 245. Bandwidth controller 240 may apply the digital values to controllers which affect the operation of tunable IF filters and amplifiers in channel filters 275 and 225.

If the channel filters have not been previously calibrated (element 310), bandwidth controller 240 may set the gains of tuner 251 and tuner 201 to known or predetermined states (element 315) and set the filters to a desired bandwidth (element 320). An example would be for bandwidth controller 240 to load calibration values from firmware 245 which set the gain of an amplifier in each channel filter to "Gain=$G_{CAL}$" and the desired bandwidth of channel filters 275 and 225 to "BW=$F_{CAL}$".

Bandwidth controller 240 may employ firmware 245 to set the two tuner local oscillators (LOs 265 and 220) to an offset within the passband of channel filters 275 and 225 (element 325). Bandwidth controller 240 may then set the local oscillator frequency from one tuner as a test tone with a known or predetermined amplitude into the input of the second tuner, and vice versa (element 325). Continuing with the previous example, bandwidth controller 240 may set LO 265 to have an oscillator frequency equal to "$F_{lo}$", wherein the output of LO 265 has a known amplitude of "Amplitude=$A_{TT}$". Bandwidth controller 240 may also set LO 220 to oscillate at a frequency equal to $F_{lo}+F_{op}$, wherein the amplitude of the signal from LO 220 also has a predetermined amplitude. Bandwidth controller 240 may trigger RF MUX 260 and RF MUX 210, causing each MUX to couple the local oscillator frequency to an input of the mixer of the other tuner.

Once the appropriate frequencies for the local oscillators have been set and coupled to the mixer of the opposite tuner, bandwidth controller 240 may tune the test tones to an output intermediate frequency (element 330) and measure the amplitudes of the signals at the outputs of channel filter 275 and channel filter 225 (element 350). For instance, bandwidth controller 240 may calculate or otherwise determine an average power (Power=$P_{TT}$) by sampling $A_{TT}$ for a number of cycles, N, for each of the channel filters at the demodulator stage via ADC 280 and ADC 230 (element 350) and store the values in memory, such as RAM or firmware 245 (element 360).

Using instructions stored in firmware 245, bandwidth controller 240 may set the two tuner local oscillators (LOs 265 and 220) to a second offset within the transition region of channel filters 275 and 225 (element 370). Bandwidth controller 240 may then cause the local oscillator frequency from one tuner to generate a test tone with a known or predetermined amplitude into the input of the second tuner, and vice versa (element 370). The attenuation of each of the filters, as well as the amplitudes of each of the output signals from the filters, should be predictable based on known characteristics of the filters.

Once the appropriate frequencies for the local oscillators have been set and coupled to the mixer of the opposite tuner for the offset of the transition region, bandwidth controller 240 may measure the amplitudes of the signals at the outputs of channel filter 275 and channel filter 225 (element 375). For instance, bandwidth controller 240 may calculate or otherwise determine a second average power (Power=$P_{TT2}$) for each of the channel filters at the demodulator stage via ADC 280 and ADC 230 and store the values in firmware 245 (element 375).

Bandwidth controller 240 may compare the differences between $P_{TT}$ and $P_{TT2}$ against expected or predetermined values of attenuation (element 380). For example, bandwidth controller 240 may compare the differences with attenuation values previously stored in a look-up table of firmware 245. Bandwidth controller 240 may then determine if the measured attenuation values are greater than the predicted values or less than the predicted values (element 385). If the measured attenuation value for a filter is greater than predicted, bandwidth controller 240 may increment the bandwidth for the filter (element 355). Conversely, if the measured attenuation value for a filter it is less than predicted, bandwidth controller 240 may decrement the bandwidth the filter (element 365).

Upon incrementing or decrementing the filter bandwidth of one more filters, bandwidth controller 240 may store the adjusted data values for the filter alignment(s) in firmware 245 (element 335), wherein the adjusted data values may correspond to systematic process error. With the adjusted data values stored in firmware 245, bandwidth controller 240 may enable normal operation of the dual tuner device (element 345). For example, bandwidth controller 240 may reset the inputs to RF MUXs 260 and 210, causing the outputs from LNAs 255 and 205 to be coupled with mixers 270 and 215, respectively. Bandwidth controller 240 may enable LOs 265 and 220 to operating at normal oscillating frequencies.

It will be apparent to those skilled in the art having the benefit of this disclosure that the embodiments herein contemplate methods, apparatuses, and systems that align channel filters for dual tuners. It is understood that the form of the embodiments shown and described in the detailed description and the drawings are to be taken merely as examples. It is intended that the following claims be interpreted broadly to embrace all the variations of the embodiments disclosed.

Although some aspects have been described in detail for some embodiments, it should be understood that various changes, substitutions and alterations can be made herein without departing from the spirit and scope of the embodiments as defined by the appended claims. Although one embodiment may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the embodiments, processes, machines, manufacture, compositions of matter, means, methods, or steps, presently existing or later to be developed that perform substantially the same function or achieve substantially the same result as the corresponding embodiments described herein may be utilized according to the embodiments herein. Accordingly, the appended claims are intended to include within their scope such processes, machines, manufacture, compositions of matter, means, methods, or steps.

What is claimed is:

1. A method, comprising:
coupling, in an integrated circuit comprising multiple tuners, a local oscillator of a first tuner to a mixer input of a second tuner;
coupling a local oscillator of the second tuner to a mixer input of the first tuner;
generating, via the local oscillators, a calibration tone at the output of the mixer of the first tuner that lies within the passband of a channel filter of the first tuner;
generating, via the local oscillators, a second calibration tone at the output of the mixer of the first tuner that lies within the transition region of the channel filter;
measuring amplitudes of the output of the channel filter for a plurality of calibration tones;
comparing amplitudes of the output of the channel filter of the first tuner to enable adjusting the bandwidth of the channel filter of the first tuner; and
adjusting the bandwidth of the channel filter based upon the measuring the amplitudes of the output of the channel filter.

2. The method of claim 1, further comprising: storing the amplitudes of the output of the channel filter of the first tuner to enable the comparing.

3. The method of claim 2, further comprising: comparing a stored amplitude of the first tuner to a predicted amplitude, wherein the predicted amplitude is based on the frequency of the stored amplitude.

4. The method of claim 3, wherein adjusting the bandwidth comprises incrementing or decrementing the filter bandwidth of the channel filter based on the comparing the stored amplitude to the predicted amplitude.

5. The method of claim 4, further comprising: storing a parameter related to the adjusted bandwidth in firmware for the first tuner.

6. The method of claim 3, wherein the comparing comprises determining differences of the stored amplitude and the predicted amplitude.

7. An apparatus, comprising:
a first tuner, wherein the first tuner comprises a first local oscillator (LO) coupled to a first mixer, wherein the output of the first mixer is coupled to the input of a first channel filter;
a second tuner, wherein the second tuner comprises a second LO coupled to a second mixer, wherein the output of the second mixer is coupled to the input of a second channel filter, wherein further the first and second tuners are in an integrated circuit comprising multiple tuners; and
a bandwidth controller (BC) coupled to the first and second tuners, the BC configured to alter the frequency of at least one of the first and second LOs to generate a plurality calibration tones and associated plurality of filtered signals at the output of the first channel filter, wherein the BC is configured to adjust a bandwidth parameter of the first channel filter based on a comparison of signal amplitudes of the plurality of filtered signals.

8. The apparatus of claim 7, further comprising a low noise amplifier (LNA) to amplify a first tuner input signal, wherein the output of the first LNA is coupled to the first mixer.

9. The apparatus of claim 8, further comprising an analog-to-digital converter (ADC) to convert the filtered signal of the first channel filter to a digital signal, wherein the ADC is coupled to the bandwidth controller to enable measurement of the signal amplitudes.

10. The apparatus of claim 9, wherein the bandwidth controller comprises firmware to store bandwidth parameters of the first and second channel filters.

11. The apparatus of claim 10, further comprising a multiplexer coupled to the LNA, the second LO, the first mixer, and the bandwidth controller, the multiplexer to select between the LNA and the second LO.

12. The apparatus of claim 11, wherein the bandwidth controller is configured to perform the comparison by determining the difference between two stored signal amplitudes.

13. The apparatus of claim 10, wherein the bandwidth controller is configured to increment and decrement bandwidth parameters of the first and second channel filters to enable a difference of the plurality of filtered signals equal a predetermined value.

14. The apparatus of claim 13, wherein the bandwidth parameters comprise digital values for transconductor-capacitor (GmC) filters and amplifiers in the first and second channel filters.

15. A system, comprising:
a first channel filter of a first tuner, the input of the first channel filter coupled to the output of a first mixer, wherein the first mixer is coupled to a first local oscillator (LO);
a second channel filter of a second tuner, the input of the second channel filter coupled to the output of a second mixer, wherein the second mixer is coupled to a second LO, wherein further the first tuner and second tuners comprise circuits of an integrated circuit comprising multiple tuners; and
a bandwidth controller (BC) coupled to the first and second tuners, the BC configured to couple the first LO to the second mixer and couple the second LO to the first mixer and generate differing calibration tones at the outputs of the first and second mixers based on differing frequencies of at least one of the first and second LOs, wherein further the BC is configured to determine and store parameters of the first and second channels based on amplitudes of filter output signals corresponding to the calibration tones.

16. The system of claim 15, further comprising a radio frequency switch in each of the tuners, the radio frequency switches arranged to couple both local oscillators to both mixers in response to at least one control signal from the BC.

17. The system of claim 15, further comprising a first analog-to-digital converter (ADC) coupled to the output of the first channel filter and a second ADC coupled to the output of the second channel filter, wherein the ADCs enable the BC to measure amplitudes of output signals of the channel filters, calculate values of average power of the output signals, and store the calculated values.

18. The system of claim 17, wherein the BC is configured to set the gain of each tuner to a predetermined gain.

19. The system of claim 18, wherein the BC is configured to compare the calculated values to predetermined values of attenuation, wherein the comparison enables the BC to increment and decrement bandwidth of the channel filters, wherein further the BC is configured to store parameters of filter adjustment to nonvolatile memory based on the comparison.

* * * * *